(12) United States Patent
Tanaka et al.

(10) Patent No.: US 6,603,528 B1
(45) Date of Patent: Aug. 5, 2003

(54) LIQUID CRYSTAL DEVICE

(75) Inventors: Toshimitsu Tanaka, Hadano (JP); Masayoshi Murata, Atsugi (JP); Takahiro Hachisu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/458,065

(22) Filed: Dec. 10, 1999

(30) Foreign Application Priority Data

Dec. 11, 1998 (JP) .......................................... 10-353465
Dec. 14, 1998 (JP) .......................................... 10-355201

(51) Int. Cl.[7] .......................................... G02F 1/1339
(52) U.S. Cl. ...................... 349/155; 349/156; 349/157; 349/153
(58) Field of Search ................. 349/155, 156, 349/157, 153

(56) References Cited

U.S. PATENT DOCUMENTS

| | | | | |
|---|---|---|---|---|
| 4,367,924 A | | 1/1983 | Clark et al. ................. 350/334 |
| 4,600,273 A | * | 7/1986 | Ohno ......................... 349/155 |
| 4,682,858 A | * | 7/1987 | Kanbe et al. ............... 349/156 |
| 4,763,995 A | * | 8/1988 | Katagiri et al. ............ 349/156 |
| 5,268,782 A | * | 12/1993 | Wenz et al. ................ 349/156 |
| 5,545,280 A | * | 8/1996 | Wenz .......................... 156/234 |
| 5,638,194 A | * | 6/1997 | Yamada et al. ............... 349/86 |
| 5,642,176 A | | 6/1997 | Abukawa et al. ........... 349/106 |
| 5,757,452 A | | 5/1998 | Masaki et al. .............. 349/110 |
| 5,771,084 A | * | 6/1998 | Fujimori et al. ............ 349/153 |
| 5,790,217 A | * | 8/1998 | Lee et al. ..................... 349/86 |
| 5,905,558 A | * | 5/1999 | Tokunaga et al. ........... 349/149 |
| 5,923,394 A | * | 7/1999 | Miyazaki et al. ............ 349/172 |
| 5,946,070 A | * | 8/1999 | Kohama et al. ............. 349/156 |
| 5,982,471 A | * | 11/1999 | Hirakata et al. ............ 349/155 |
| 6,384,882 B1 | * | 5/2002 | Nagayama et al. ......... 349/110 |
| 6,388,728 B1 | * | 5/2002 | Tokunaga et al. ........... 349/158 |
| 6,392,735 B1 | * | 5/2002 | Tani ............................ 349/156 |

FOREIGN PATENT DOCUMENTS

| JP | 56-107216 | | 8/1981 |
|---|---|---|---|
| JP | 09-061837 | * | 3/1997 |
| JP | 09-061838 | * | 3/1997 |

OTHER PUBLICATIONS

Voltage–Dependent Optical Activity of a Twisted Nematic Liquid Crystal, Applied Physics Letters, vol. 18, No. 4, (1971), pp. 127–128.

"Smectic A and Smectic C Materials with Large Negative Thermal Expansion Coefficients", Epstein, et al., Condensed Matter Lab., 169–170.

* cited by examiner

*Primary Examiner*—Robert H. Kim
*Assistant Examiner*—David Chung
(74) *Attorney, Agent, or Firm*—Fitzpatrick, Cella, Harper & Scinto (57) ABSTRACT

A liquid crystal device is constituted by a pair of substantially parallel substrates disposed opposite to each other to leave a gap extending two-dimensionally therebetween including a rectangular wider gap region and a peripheral frame-shaped narrower gap region surrounding the wider gap region, a plurality of spacers disposed in the gap over the wider and narrower gap regions, and a liquid crystal disposed between the pair of substrates so as to form pixels in the wider gap region. The spacers are disposed to have a larger volume per unit substrate area in the wider gap region and a smaller volume per unit substrate area in the narrower gap region, thus providing a uniform cell gap between the substrates.

8 Claims, 9 Drawing Sheets

LIQUID CRYSTAL DEVICE

BACKGROUND OF THE INVENTION

The present invention relates to a liquid crystal device for use in a liquid crystal optical switch, a liquid crystal optical shutter, etc., particularly to a liquid crystal device improved in display characteristics and electro-optical characteristics.

Heretofore, as a display apparatus for displaying various data or information, CRTs (cathode ray tubes) have been known and widely used for displaying motion pictures of television and video tape recorders or as monitor displays for personal computers. Based on the operation characteristic, however, the CRT is accompanied with difficulties such that the recognizability of a static image decreases due to flickering and scanning fringes caused by insufficient resolution, and the fluorescent member deteriorates due to burning. Further, it has been found that electromagnetic waves emitted from CRTs can adversely affect human bodies (e.g., health of VDT operators). Further, the CRT structurally has a large rearward space behind the display surface, so that the space economization in offices and at home may be obstructed thereby.

As a type of device solving such problems of the CRT, there has been known a liquid crystal panel (device), including a type using a twisted nematic (TN) liquid crystal as disclosed by M. Schadt and W. Helfrich, Appl. Phys. Lett., vol. 18, no. 4, pp. 127–128 (1971).

Liquid crystal devices using TN liquid crystal include a simple matrix-type liquid crystal device and an active matrix-type liquid crystal device wherein each pixel is provided with a TFT (thin film transistor).

The simple matrix-type liquid crystal device is advantageous from a viewpoint of production cost. This type of liquid crystal device is, however, accompanied with a problem that it is liable to cause crosstalk when driven in a multiplex manner using an electrode matrix of a high pixel density, and therefore the number of pixels is retracted. The problems of crosstalk and response speed can be solved by the active matrix-type liquid crystal device using TFTs, but, on the other hand, producing a larger area device of this type would be extremely difficult since inferior pixels are liable to occur. Further, even if such production is possible, the production cost would be increased enormously due to a lowering in production yield.

For providing improvements in light of the above-mentioned difficulties of the conventional types of TN liquid crystal devices, a liquid crystal device of the type which controls transmission of light in combination with a polarizing device by utilizing a refractive index anisotropy of ferroelectric (chiral smectic) liquid crystal (abbreviated as "FLC") molecules has been proposed by Clark and Lagerwall (Japanese Laid-Open Patent Application (JP-A) 56-107216, U.S. Pat. No. 4,367,924). The ferroelectric liquid crystal (FLC) generally has chiral smectic C phase (SmC*) or H phase (SmH*) in a specific temperature range and, in the phase, shows a property of assuming either one of a first optically stable state and a second optically stable state in response to an electric field applied thereto and maintaining such a state in the absence of an electric field, namely bistability, and also have a very quick response speed because it causes inversion switching based on its spontaneous polarization. Thus, the FLC develops bistable states showing a memory characteristic and further has an excellent viewing angle characteristic. Accordingly, the FLC is considered to be suitable for constituting a high speed, high resolution and large area display device.

In the FLC panel (device), at an initial alignment stage, liquid crystal molecules placed in a first stable state and those placed in a second stable state are co-present in a domain. More specifically, in a device using a chiral smectic liquid crystal developing bistable states, an alignment control force for aligning liquid crystal molecules to be placed in a first stable state and that for aligning liquid crystal molecules to be placed in a second stable state have a substantially equal energy level. As a result, when the chiral smectic liquid crystal is disposed between a pair of substrates, each provided with an alignment film in a thickness sufficiently small to assume bistability, resultant oriented (aligned) liquid crystal molecules in a domain include a portion placed in a first stable state and a portion placed in a second stable state in combination at an initial alignment stage.

Further, similar to the FLC device, a liquid crystal device of the type wherein a refractive index anisotropy and a spontaneous polarization of liquid crystal molecules are utilized, there has been known a liquid crystal device using an anti-ferroelectric liquid crystal (abbreviated as "AFLC"). The AFLC generally has chiral smectic CA phase (SmCA*) in a specific temperature range and, in the phase, shows a property of assuming an average optically-stable state, wherein liquid crystal molecules are oriented in a direction of a normal to smectic (molecular layers under no electric field application and tilting its average molecular axis direction from the layer normal direction under application of an electric field). Further, the AFLC causes switching based on its spontaneous polarization in combination with the applied electric field, thus exhibiting a very quick response. Accordingly, the AFLC is expected to be used in a high speed liquid crystal panel.

As one of the conventional liquid crystal devices, a transmission-type liquid crystal panel (device) will be described with reference to FIG. 5.

Figure 5:
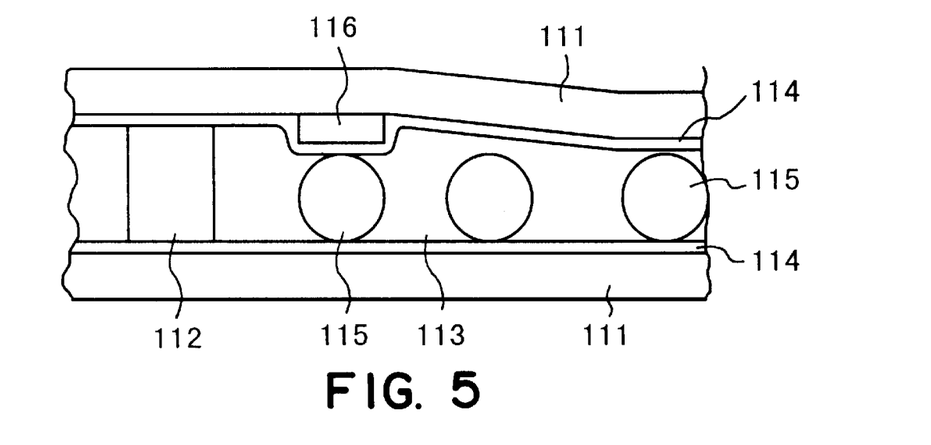
FIG. 5 is a schematic sectional view of an embodiment of a conventional liquid crystal device.

FIG. 5 is a schematic sectional view showing a portion closer to a boundary between a display region and a peripheral region of an embodiment of a conventional liquid crystal panel.

Referring to FIG. 5, a liquid crystal display panel (liquid crystal device) includes a pair of oppositely disposed glass substrates 111 and 111 which are bonded to each other via a sealing agent 112 at the periphery thereof with a gap. The gap is held by spacer beads 115 and filled with a chiral smectic liquid crystal 113. On the surface of each of the glass substrates 111 (111), a laminated film 114 comprising, e.g., a transparent (ITO: indium tin oxide) electrode, an insulating film, an inorganic oxide insulating film and an aligning-treated alignment film for aligning the liquid crystal 113 sequentially disposed on the glass substrate is formed. In the peripheral region of the device, a frame-shaped masking (light-interrupting) member 116 (so called "black matrix") comprising, e.g., a metal is disposed so as to surround the display region.

The liquid crystal display panel may generally be driven by applying a voltage of at least a certain threshold value to the liquid crystal 113. In this case, if a cell gap between the glass substrates 111 (111) is not uniform over the entire picture area, an electric field applied to the liquid crystal 113 becomes nonuniform to cause image irregularity and irregularity in driving characteristics, thus resulting in inferior image qualities. Particularly, in the case of a liquid crystal display panel using the FLC or AFLC, it is necessary to provide a small cell gap of ca. 1–3 μm. Accordingly, even when a degree of nonuniformity of cell gap is slight, the resultant nonuniform cell gap significantly affects image quality.

In order to keep such a small cell gap uniform, it has been proposed to use spacer beads (spherical spacer) 115 or stripe spacers formed through flexible printing, photolithography or dry film.

The latter stripe spacers employed in a liquid crystal display panel may generally be formed in a pattern such that each stripe line extends from a liquid crystal injection port with an identical width, a gradually increasing width or a gradually decreasing width. The stripe spacers may generally be formed with a material having a prescribed viscosity so that each stripe line has an identical width and a width as large as possible.

On the other hand, the former spacer beads 115, as shown in FIG. 5, may ordinarily be dispersed uniformly over the entire display panel. As a result, under the frame-shaped masking member 116 providing a protruding surface, the spacer beads 115 may be located, thus resulting in nonuniform cell gap distribution between the display region inside the masking member 116 and the peripheral region including the masking member 116 as shown in FIG. 5.

In order to solve the problem, the liquid crystal display panel using the spacer beads is required to modify its layer structure ox a pattern of metal electrodes so as not to cause a nonuniform cell gap, thus leading to many constraints on cell structure design.

Further, the latter stripe spacers function as a cell gap-regulating member when a pair of substrates are applied to each other under a certain pressure. In that case, a portion of the stripe spacers contacting the frame-shaped masking member 116 is not readily deformed compared with other portions. As a result, in the peripheral region where the masking member 116 is formed, e.g., the (upper) glass substrate 111 is liable to be extruded, thus failing to provide a uniform cell gap over the entire display panel.

Further, when an adhesive (contact) area per unit substrate area between the glass substrate 111 and the stripe spacers in the peripheral region including the masking member 116 is different from that in the display region including an electrode matrix, the resultant cell gap distribution is liable to be changed, thus leading to a nonuniform cell gap.

Next, another problem of conventional liquid crystal devices will be described.

The above-mentioned FLC includes one showing a characteristic such that a response speed or time ($\tau$) of a liquid crystal (FLC) provides a minimum ($\tau$Vmin) when a voltage (V) applied to the liquid crystal is increased (hereinbelow, referred to as "$\tau$Vmin characteristic"). The liquid crystal of this type ($\tau$Vmin mode) shows a negative dielectric anisotropy ($\Delta\xi<0$) or a positive biaxial dielectric anisotropy ($\Delta\xi>0$) and provides a $\tau$Vmin characteristic based on a torque due to the dielectric anisotropy for stabilizing the FLC larger than that due to inversion switching of the FLC. The FLC showing the $\tau$Vmin characteristic allows the resultant liquid crystal device to provide a high brightness, a high contrast and a high speed responsiveness. Further, some of the AFLCs described above have the $\tau$Vmin characteristic.

Figure 13:
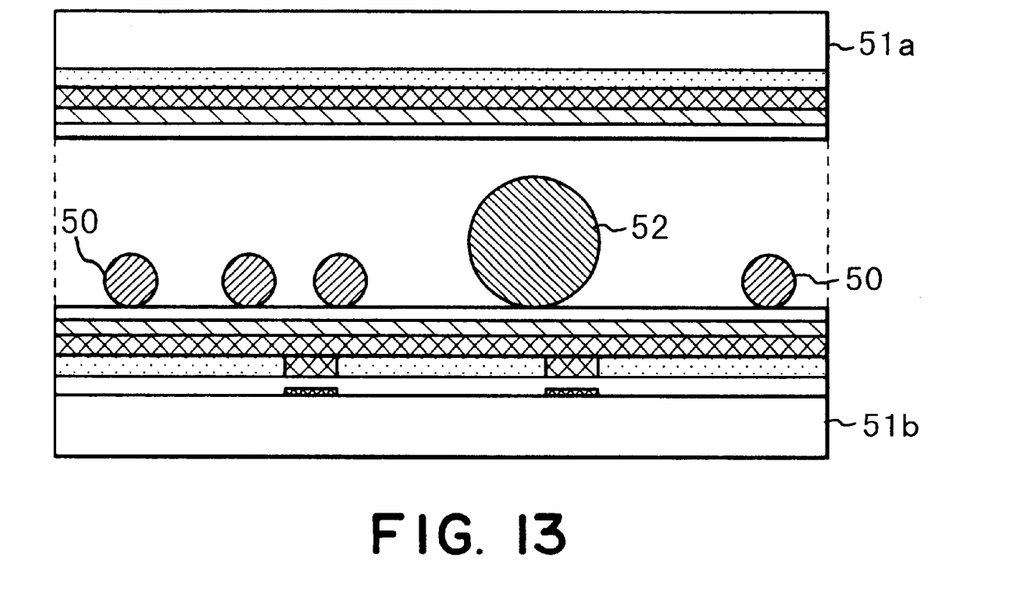
FIG. 13 is a schematic sectional view for illustrating a step of forming a conventional liquid crystal device including spacer beads.

FIG. 13 is a schematic sectional view showing a part of the production steps of a conventional liquid crystal device using the FLC or AFLC of $\tau$Vmin mode or the above-described another FLC or AFLC in combination with spacer beads 50.

Referring to FIG. 13, the spacer beads 50 are dispersed on one (a substrate 51b in this embodiment) of a pair of substrates 51a and 51b, each having thereon a plurality of films such as ITO electrode, organic or inorganic (oxide) films, and alignment films as mentioned above with reference to FIG. 5. In FIG. 13, reference numerals for the films are omitted for simplicity of explanation.

These spacer beads 50 can provide a relatively smaller cell gap (e.g., 1–3 μm) if particle sizes thereof are made uniform. However the spacer beads 50 are generally dispersed uniformly on one of the substrates in many cases, so that a part of the spacer beads 50 may be located at pixel portions for display in the display region, thus being liable to cause alignment defects in the vicinity of such spacer beads to result in insufficient contrast of the resultant liquid crystal device.

In addition, the spacer beads 50 may be used in combination with adhesive beads 52 for improving an adhesive strength between the pair of substrates 51a and 51b as shown in FIG. 13.

The adhesive beads 52, however, similar to the spacer beads 50, are liable to cause alignment defects which lower contrast of the resultant liquid crystal device.

Figure 14:
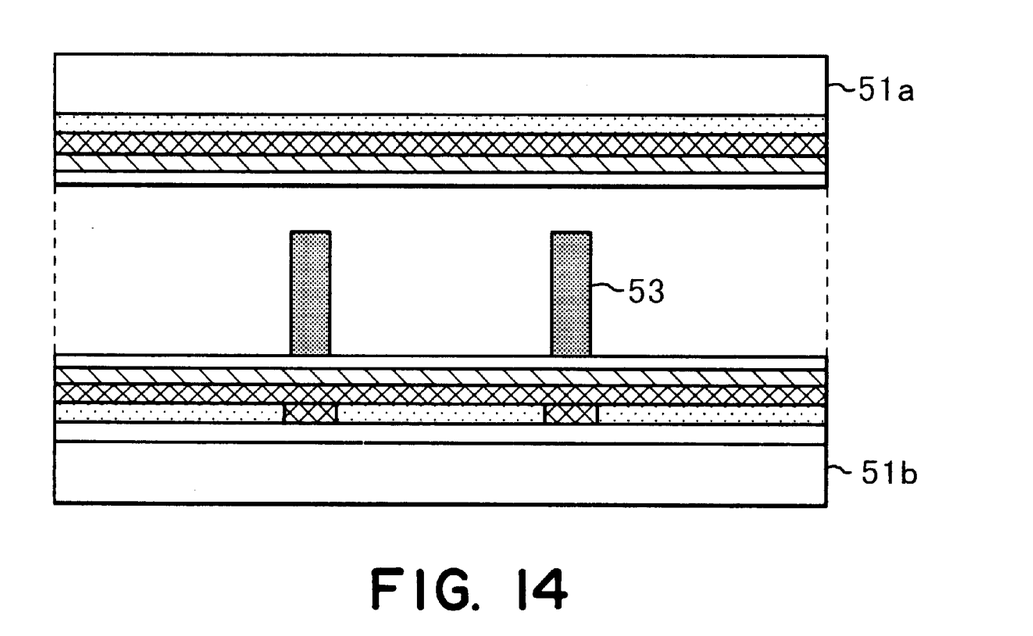
FIG. 14 is a schematic sectional view for illustrating a step of forming a conventional liquid crystal device including stripe spacers.

FIG. 14 is a schematic sectional view showing a part of the production steps of a conventional liquid crystal device employing stripe spacers 53.

Referring to FIG. 14, the stripe spacers 53 may generally be formed selectively at non-pixel portions using a photolithographic process. As a result, the stripe spacers 53 are not present at pixel portions for display, thus being liable to cause few alignment defects of a liquid crystal used.

The stripe spacers 53 may be provided with an adhesive function in addition to the cell gap-regulating function, thus remarkably decreasing the number of alignment defects compared with the case of using the adhesive particles 52.

Figure 15:
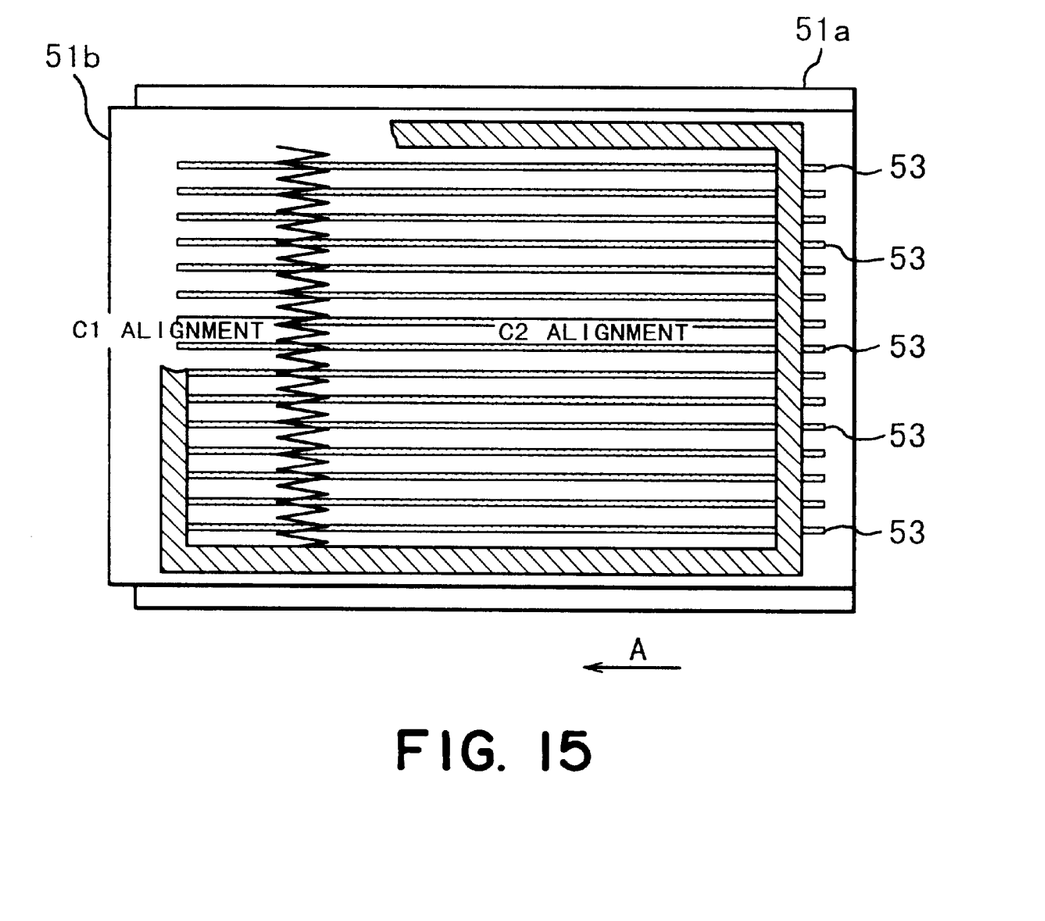
FIG. 15 is a schematic plan view showing an alignment state including C1 and C2 alignment regions observed in the conventional liquid crystal device shown in FIG. 14.

However, when such advantageous stripe spacers 53 are used in a liquid crystal device shown in FIG. 15, it has been found that the display region includes a C1 alignment region and a C2 alignment region, and the C2 alignment region is liable to appear on a downstream side of a rubbing direction A, specifically a region ranging from one end (distant from a liquid crystal injection port) of each stripe spacer 53 to a position ten to several ten millimeters apart therefrom. This may be attributable to disorders in flow of the injected liquid crystal in the vicinity of the ends of the stripe spacers 53 and phase transition thereof. In the C1 alignment region, drive (switching) of the liquid crystal is not performed sufficiently and a lowering in contrast is caused.

SUMMARY OF THE INVENTION

A principal object of the present invention is to provide a liquid crystal device having solved the above-mentioned problems.

A first object of the present invention is to provide a liquid crystal device capable of suppressing an unevenness of a cell gap to provide uniform driving characteristics in the entire display area.

A second object of the present invention is to provide a liquid crystal device capable of substantially suppressing an occurrence of alignment defects to improve contrast.

According to the present invention, in view of the first object, there is provided a liquid crystal device comprising a pair of substantially parallel substrates disposed opposite to each other to leave a gap extending two-dimensionally therebetween including a rectangular wider gap region and a peripheral frame-shaped narrower gap region surrounding the wider gap region, a plurality of spacers disposed in the gap over the wider and narrower gap regions, and a liquid crystal disposed between the pair of substrates so as to form pixels in the wider gap region, wherein the spacers are disposed to have a larger volume per unit substrate area in the wider gap region and a smaller volume per unit substrate area in the narrower gap region.

In another aspect in view of the first object, according to the present invention, there is also provided a liquid crystal device comprising a pair of substantially parallel substrates disposed opposite to each other to leave a gap extending two-dimensionally therebetween including a rectangular wider gap region and a peripheral frame-shaped narrower gap region surrounding the wider gap region, a plurality of spacers disposed in the gap over the wider and narrower gap regions, and a liquid crystal disposed between the pair of substrates so as to form pixels in the wider gap region, wherein the spacers are disposed to have a spacing between the spacers and one of the substrates in the narrower gap region.

According to the present invention, in view of the second object, there is provided a liquid crystal device comprising a pair of substrates each provided with a plurality of stripe electrodes and an alignment film having a uniaxial alignment axis for aligning a liquid crystal, a plurality of stripe spacers disposed between the substrates in parallel with stripe electrodes provided to at least one of the substrates, and a liquid crystal layer comprising a ferroelectric or anti-ferroelectric liquid crystal disposed together with the stripe spacers between the substrates, wherein the plurality of stripe spacers are connected with a connecting spacer at their ends along one side so as to block each spacing between adjacent stripe spacers.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Hereinbelow, the present invention will be described based on some preferred embodiments with reference to the drawings.

Figure 1:
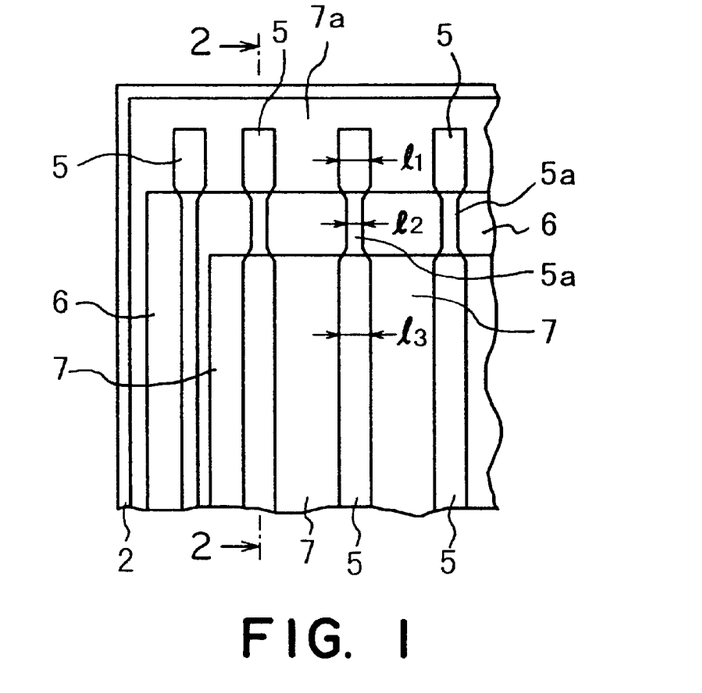
FIG. 1 is a schematic plan view of an embodiment of the liquid crystal device including wider and narrower gap regions according to the present invention.
Figure 2:
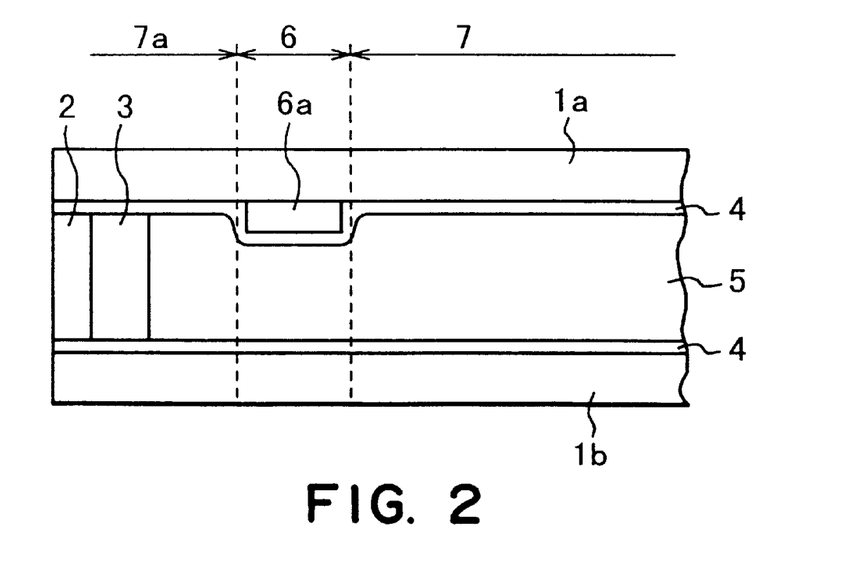
FIG. 2 is a schematic sectional view taken along line A—A shown in FIG. 1.

FIG. 1 shows a sectional view of an embodiment of the liquid crystal device including wider and narrower gap regions according to the present invention in order to accomplish the first object of the present invention, and FIG. 2 shows a plan view taken along line A—A shown in FIG. 1.

Referring to these figures, the liquid crystal device includes a pair of substantially parallel substrates 1a and 1b disposed opposite to each other to leave a gap extending two-dimensionally therebetween including a rectangular wider gap region 7 and a peripheral frame-shaped narrower gap region 6 surrounding the wider gap region 7. The liquid crystal device further includes a plurality of spacers 5 disposed in the gap over the wider and narrower gap regions 7 and 6 and a liquid crystal (not shown) disposed between the pair of substrates 1a and 1b so as to form pixels in the wider gap region 7. In this embodiment, the spacers are characterized by being disposed to have a larger volume per unit substrate area in the wider gap region 7 and a smaller volume per unit substrate area in the narrower gap region 6.

In the narrower gap region 6, a frame-shaped masking (light-interrupting) member 6a of, e.g., a metal or black resin, is formed at the surface of the substrate 1a.

Figure 6:
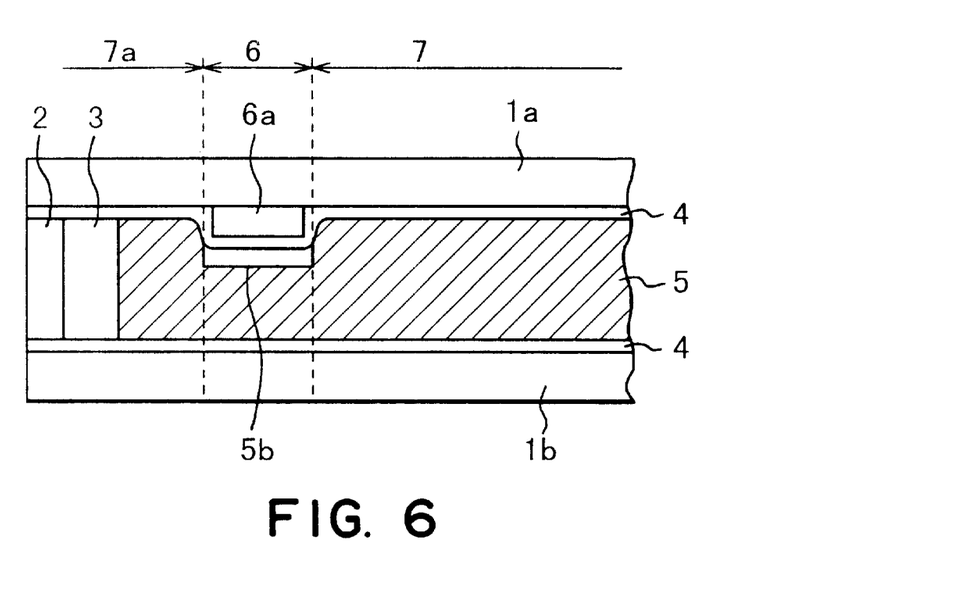
FIG. 6 is a schematic sectional view of another embodiment of the liquid crystal device including wider and narrower gap regions of the present invention.

As another embodiment, the spacers 5 are characterized by being disposed to have a spacing between a portion 5b of the spacers 5 and a surface layer 4 of the substrate 1a in the narrower gap region 6 as shown in FIG. 6.

In the embodiment shown in FIGS. 1 and 2, the spacers may preferably include a first portion 5 having the larger volume in the wider gap region 7 and a second portion 5a which has the smaller volume in the narrower gap region 6 and is obtained from a portion having a smaller width (l2) than that (l3) for the first portion before the pair of substrates 1a and 1b are applied to each other to form the gap. Further, the spacers 5 after the substrates are applied to each other may preferably include a first portion having the larger volume in the wider gap region 7 and a second portion having the smaller volume in the narrower gap region, and in this case the first and second portions may preferably have an identical width. At that time, the spacers 5 may preferably include a first portion having the larger volume in the wider gap region 7 and a second portion having the smaller volume in the narrower gap region 6, and the first and second portions may preferably have an identical adhesive area per unit substrate area.

Figure 3:
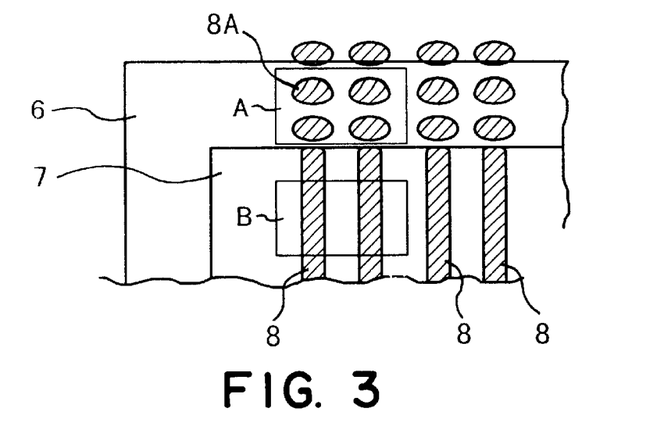
FIGS. 3 and 4 are, respectively, a schematic plan view of another embodiment of the liquid crystal device including wider and narrower gap regions of the present invention.
Figure 4:
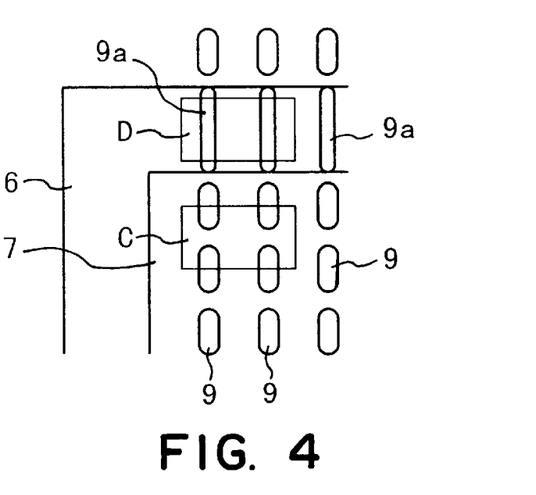

In the above-mentioned embodiments shown in FIGS. 1, 2 and 6, the spacer 5 may be formed in other shapes as shown in FIGS. 3 and 4 so long as the above-mentioned conditions (e.g., as to volume, width, adhesive area, etc.) are satisfied.

Specifically, in FIG. 3, the spacers include stripe spacers 8 in the wider gap region 7 and elliptic spacers 8a in the narrower gap region 6. In FIG. 4, the spacers include elliptic spacers 9 and stripe spacers 9a in the wider gap region 7 and the narrower gap region 6, respectively. In the present invention, the spacer shapes in the wider and narrower gap regions 7 and 6 may be appropriately modified in view of surface unevennesses of the pair of substrates.

In the embodiments described above, the wider gap region 7 corresponds to a display region. In the display region, 400–2000 Å thick stripe electrodes (not shown) may be formed on the pair of substrates 1a and 1b so as to intersect each other to form a plurality of pixels each at an intersection (i.e., a simple matrix-type). Further, each pixel in the display region may be provided with a switching element (e.g., TFT: thin film transistor) (i.e., an active matrix-type).

On the electrodes, a plurality of films, such as an insulating film (generally 400–2500 Å), an inorganic oxide insulating film (100–500 Å) and an alignment film may be formed so as to cover the electrodes. These electrodes and the plurality of films thereon are, e.g., inclusively shown by a reference numeral 4 in FIGS. 2 and 6.

The gap between the pair of substrates 1a and 1b is sealed with a sealing agent 2 and filled with a liquid crystal 3. The liquid crystal 3 may include a chiral smectic liquid crystal (ferroelectric or anti-ferroelectric liquid crystal) effecting switching based or spontaneous polarization and may include other liquid crystal materials.

Hereinbelow, an example of a process for producing the above-mentioned liquid crystal devices will be described.

First, on each of the substrates 1a and 1b, a laminated film 4 including a transparent electrode, an insulating film, an inorganic oxide insulating film and an alignment film is formed.

On one or both of the laminated films 4 formed on the substrates 1a and 1b, a plurality of spacers 5 (5a, 5b, 8, 8a, 9, 9a) are formed in a prescribed pattern.

The spacers 5 may be formed of a photo- or heat-curable material by applying the material onto the substrate(s) 1a (1b) according to, e.g., printing and curing the material, followed by pattern formation through, e.g., photolithography.

On one or both of the thus-treated substrates 1a and 1b on which the spacers 5 are formed, a silica solution containing antimony-doped $SnO_2$ fine particles (e.g., ca. 10 nm) may be applied by spin-coating, thus improving the resultant cell gap uniformity.

Thereafter, the pair of substrates 1a and 1b thus treated are applied to each other via the spacers 5 and a peripheral sealing agent 2 to leave a spacing in which a liquid crystal 3 is filled, thus preparing a liquid crystal device (panel).

In the above production process, the alignment films are subjected to a uniaxial aligning treatment (rubbing treatment) before or after the formation of the spacers 5. The rubbing treatment may be performed using a cotton cloth or nylon piles.

In the case where the spacers 5 are formed on one of the substrates 1a and 1b and the rubbing treatment is performed after spacer formation, rubbing conditions for the pair of substrates 1a and 1b may be the same or different if the liquid crystal 3 is placed in a suitable alignment state by the rubbing treatment.

According to the above-mentioned embodiments shown in FIGS. 1–4 and 6, the spacers are disposed to have a larger volume per unit substrate area in the wider gap region 7 and a smaller volume per unit substrate area in the narrower gap region 6 in view of the protruded portion (frame-shaped masking member 6) in the narrower gap region 6, and the spacers are uniformly and readily pressed by the substrates 1a and 1b, thus providing a uniform cell gap while suppressing or minimizing an irregularity in gap distribution over the entire display region as shown in FIGS. 2 and 6.

Further, after the substrates 1a and 1b are applied to each other via the spacers 5, the spacers have an identical width over the wider and narrower gap regions 7 and 6, thus allowing a smooth liquid crystal injection with no injection irregularity.

Figure 7:
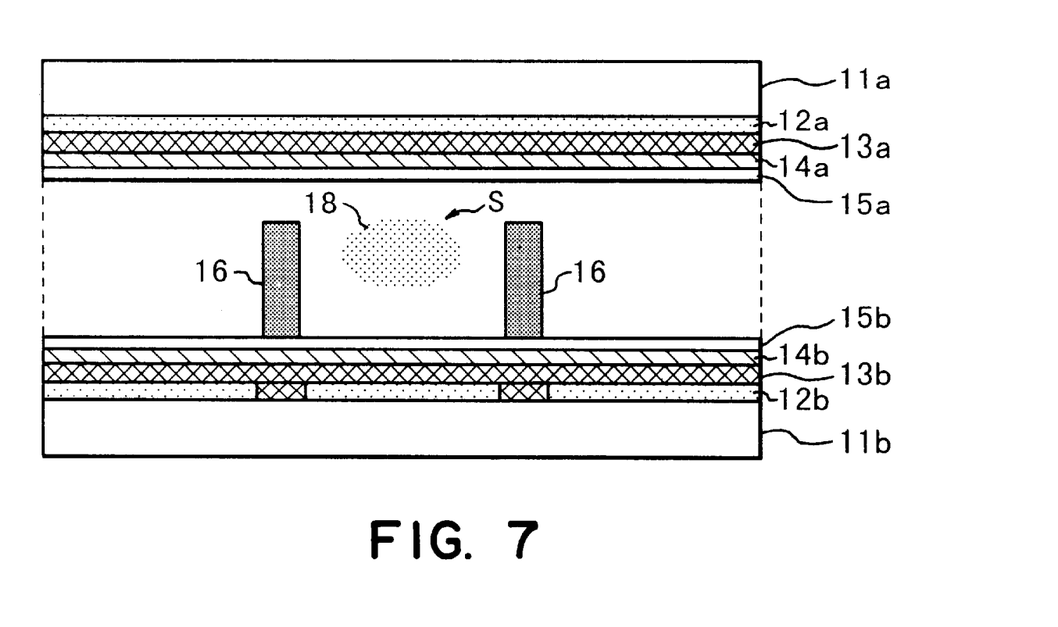
FIG. 7 is a schematic sectional view of an embodiment of the liquid crystal device including stripe spacers and a connecting spacer according to the present invention.
Figure 8:
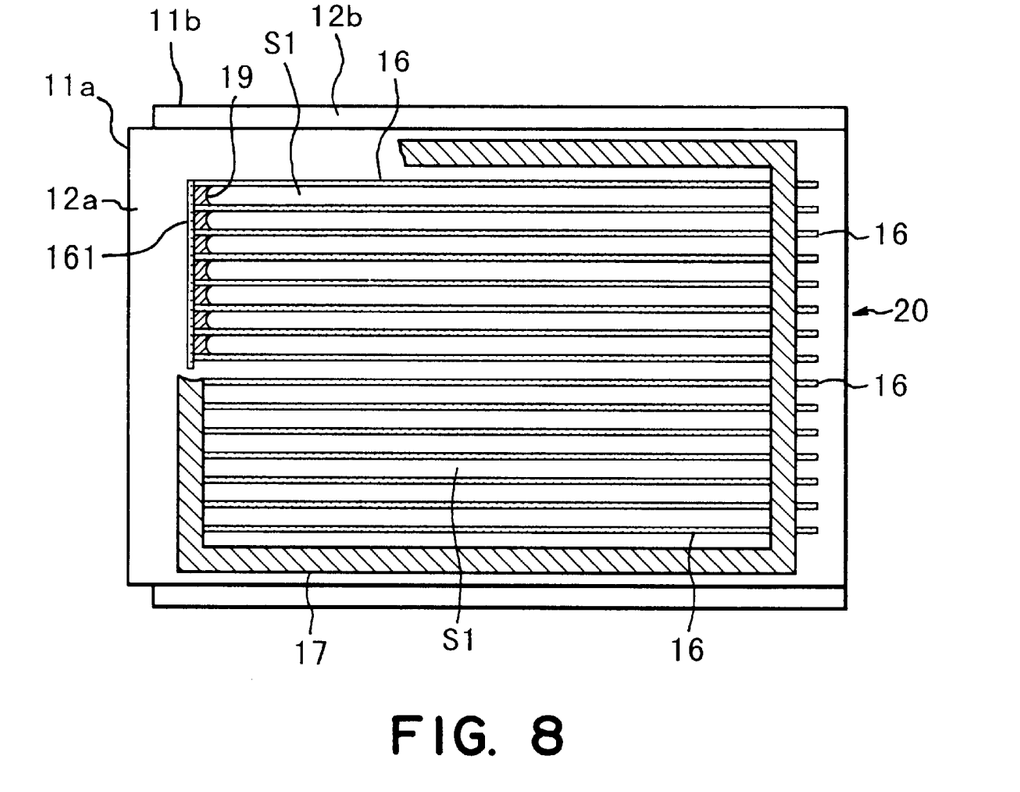
FIG. 8 is a schematic plan view of an embodiment of the liquid crystal device including stripe spacers and a connecting spacer of the present invention.

FIGS. 7 and 8 show sectional and plan views, respectively, of an embodiment of the liquid crystal device including stripe spacers 16 and a connecting spacer 161 according to the present invention in order to accomplish the second object of the present invention.

Referring to these figures, the liquid crystal device includes a pair of substrates 11a and 11b each provided with a plurality of stripe electrodes 12a (12b), an insulating film 13a (13b), an inorganic oxide insulating film 14a (14b), and an alignment film 15a (15b) having a uniaxial alignment axis for aligning a liquid crystal in this order. The liquid crystal device further includes a plurality of stripe spacers 16 disposed between the substrates 11a and 11b in parallel with stripe electrodes 12a (12b) provided to at least one of the substrates 11a and 11b, and a liquid crystal layer comprising a ferroelectric or anti-ferroelectric liquid crystal 18 disposed together with the stripe spacers 16 between the substrates 11a and 11b. In this embodiment, the plurality of stripe spacers 16 are characterized by being connected with a connecting spacer 161 at their ends along one side so as to block each spacing S (S1) between adjacent stripe spacers 16. Further, the liquid crystal device includes a frame-shaped masking member 17 and a liquid crystal injection port 20.

In this embodiment, the connecting spacer may preferably be disposed perpendicular to respective adjacent stripe spacers. Further, the connecting spacer may preferably be disposed so as to have a prescribed angle (e.g., 10–30 degrees) with respective adjacent stripe spacers or formed in an arc shape with respective adjacent stripe spacers. The stripe spacers may preferably have a tapered end connected with the connecting spacer. In that case, the tapered end may preferably have a length of 5–10 mm. The connected stripe spacers may preferably be open to a liquid crystal injection port along a side opposite to said one side. Further, the stripe spacers may be disposed at a portion free from the stripe electrodes.

The above-mentioned stripe spacers and the connecting spacer may comprise an identical material. The connecting spacer may comprise an epoxy adhesive, and the stripe spacers may comprise a photosensitive acrylic resin.

The liquid crystal device may further comprise an inorganic oxide film disposed under the alignment film. The alignment film may preferably comprise a polyimide film. The alignment film may preferably have a surface tension of 30–40 dyne/cm in terms of its dispersion item.

According to the above-described embodiment with reference to FIGS. 7 and 8, the plurality of stripe spacers 16 are connected with the connecting spacer 161 at their ends along a side of the liquid crystal device so as to block each spacing between adjacent stripe spacers 16, thus effectively suppressing irregular flow of the injected liquid crystal 18 to provide a uniform C2 alignment state over the entire display region.

Hereinbelow, the present invention will be described more specifically based on examples with reference to the drawings.

EXAMPLE 1 AND COMPARATIVE EXAMPLE 1

A liquid crystal device (15 in. (250×300 mm) panel) including wider and narrower gap regions as shown in FIGS. 1 and 2 was prepared in the following manner.

On a 1.1 mm thick glass substrate 1a, a 0.4 μm thick frame-shaped masking (light-interrupting) member 6a of Cr was formed in a narrower gap region 6, and thereon, 700 Å thick stripe-shaped transparent electrodes of ITO (indium tin oxide) were formed by sputtering and a photolithographic process. On the transparent electrodes, a 500 Å thick insulating film of $SiO_2$ and a 500 Å thick insulating oxide film of tin oxide containing electroconductive particles were successively formed each by using an angstromer (printing or application means) and curing at 200–300° C. Thereafter, ca. 200 Å thick alignment film of polyimide was formed on the insulating films by applying a polyimide precursor solution by spin-coating and then hot curing.

On the alignment film, a plurality of spacers of an acrylic-type photosensitive material ("JNPC-43", mfd. by Japan Synthetic Rubber Co., Ltd.) was formed in a prescribed pattern in the following manner.

The acrylic-type photosensitive material was spin-coated on the alignment film and pre-baked at 80–90° C. for 180 seconds. After cooling to room temperature, the photosensitive material was subjected to ultraviolet (UV) light irradiation (energy: 250 $mJ/cm^2$, wavelength: 365 nm) using an ultra-high pressure mercury lamp and a photosensitive mask, developed with an alkali developer (a mixture of "CD902" (mfd. by Japan Synthetic Rubber Co., Ltd.) and a 1% aqueous solution of N-methylpiperidine) for 30 seconds, subjected to rinse treatment with pure water, and post-baked at 200° C. for 10 minutes in a clean oven to form 1.3 μm thick stripe-shaped spacers 5, each having a narrowed portion 5a as shown in FIG. 1.

The stripe spacers 5 (5a) were disposed in non-pixel (stripe electrode) regions to have a width l3 of 25 μm in a wider gap region 7, a width l2 of 21 μm in a narrower gap region 6 and a width l1 of 25 μm in an outer gap region 7a while keeping a pitch (a distance between center lines of adjacent stripe spacers) of 230 μm.

The thus-treated glass substrate 1a was subjected to rubbing using a cotton cloth at the exposed surface of the polyimide alignment film.

Separately, on a 1.1 mm thick glass substrate 1b, a color filter was formed, and thereon a plurality of films were formed in the same manner as the above-treated glass substrate 1a except that the masking member 6a and the spacers 5 (5a) were not formed.

At the periphery of the glass substrate 1b, a sealing agent 2 of epoxy resin was applied.

Thereafter, the pair of glass substrates 1a and 1b were applied to each other at 150° C. for 1.5 hours and at a pressure of 1 $kg/cm^2$ so that their rubbing directions are identical and parallel to each other and their stripe electrodes (transparent electrodes) intersect each other at right angles to form a matrix of pixels at their intersections, thus curing the sealing agent 2.

At that time, the stripe spacers 5 (5a) had an identical width (l1=l2=l3) over the entire panel.

In the gap (spacing) between the pair of substrates 1a and 1b, a chiral smectic liquid crystal 3 was filled to prepare a liquid crystal device (panel).

For comparison (as Comparative Example 1), a comparative liquid crystal device was prepared in the same manner as in Example 1 (the liquid crystal device shown in FIGS. 1 and 2) except that each of the stripe spacers was formed to have an identical width (25 μm) over wider and narrower gap regions (before the pair of glass substrates were applied to one another).

The thus prepared liquid crystal device (Ex. 1) and comparative liquid crystal device (Comp. Ex. 1) were subjected to measurement of cell gaps at some points in the vicinity of the masking member 6a.

The results are shown in the following table.

TABLE

| | (cell gap: μm) | | | | |
| --- | --- | --- | --- | --- | --- |
| | Distance from masking member 6a | | | | |
| | 0 mm | 1 mm | 5 mm | 10 mm | 20 mm |
| Ex. 1 | 1.1 | 1.0 | 1.0 | 1.0 | 1.0 |
| Comp. Ex. 1 | 1.4 | 1.3 | 1.2 | 1.1 | 1.0 |

As apparent from the above table, when compared with the comparative (conventional) liquid crystal device showing a nonuniform cell gap (i.e., a locally increased cell gap) in the vicinity of the narrower gap region 6, the liquid crystal device according to the present invention was formed to provide a substantially uniform cell gap over the entire liquid crystal panel.

This is attributable to a particular shape of each stripe spacer including an identical width (l3=l1) portion 5 in the wider gap regions 7 and 7a and a smaller width (l2<l1, l3) portion 5a (before application of the pair of substrates) in view of the uneven surface of the substrate. The smaller width portion 5a is readily deformed compared with the identical width portion 5, thus resulting in the entire identical width portion over the liquid crystal panel.

EXAMPLE 2

A liquid crystal as shown in FIG. 3 was prepared in the same manner as in Example 1 except that the shape (pattern) of the plurality of spacers 5 (5a) was changed to that shown in FIG. 3.

Specifically, the spacers were disposed on the glass substrate 1a to have stripe spacers 8, each having a width of 25 μm in the wider gap region 7, and elliptic spacers 8a, each having a longer diameter of 30 μm larger than the width of the stripe spacers 8 and a shorter diameter of 20 μm in the narrower gap region 6.

The thus-prepared liquid crystal device was found to have an adhesive (contact) area for the stripe spacers 8 of 25×230 $μm^2$ per unit substrate area B (230×230 $μm^2$) in the wider gap region 7 and an adhesive area for the elliptic spacers 8a of 25×230 $μm^2$ per unit substrate area A (230×230 $μm^2$) in the narrower gap region 6, thus resulting in an identical adhesion area in the entire region to provide a substantially uniform cell gap similar to Example 1.

EXAMPLE 3

A liquid crystal as shown in FIG. 4 was prepared in the same manner as in Example 1 except that the shape (pattern) of the plurality of spacers 5 (5a) was changed to that shown in FIG. 4.

Specifically, the spacers were disposed on the glass substrate 1a to have ellipse-like spacers 9, each having a larger width of 29 μm in the wider gap region 7, and stripe spacers 9a, each having a smaller width of 21 μm in the narrower gap region 6.

The thus-prepared liquid crystal device was found to have an adhesive (contact) area for the ellipse-like spacers 9 of 25×230 μm² per unit substrate area C (230×230 μm²) in the wider gap region 7 and an adhesive area for the stripe spacers 9a of 25×230 μm² per unit substrate area D (230× 230 μm²) in the narrower gap region 6, thus resulting in a substantially uniform cell gap similar to Example 1.

In the above Examples 1–3, the plurality of spacers (5 and 5a, 8 and 8a, and 9 and 9a) were formed on one of the glass substrates (the glass substrate 1a).

As a modification for Examples 1–3, the spacers may be formed on both of the glass substrates 1a and 1b. Further, in the case where the surface shape of the substrates in the narrower gap region 6 provides a recessed portion, as opposed to the protruded portion 6a as in Examples 1–3, the shapes and sizes of the spacers may appropriately be changed so as to provide an identical adhesive (contact) area over the wider and narrower gap regions 7 and 6. In order to further improve cell gap uniformity, the shape and size of each spacer may be changed depending on an associated stripe electrode.

EXAMPLE 4

Three liquid crystal devices including wider and narrower gap regions as shown in FIGS. 7 and 8 were each prepared through production steps shown in FIGS. 9A–9D.

Figure 9A:
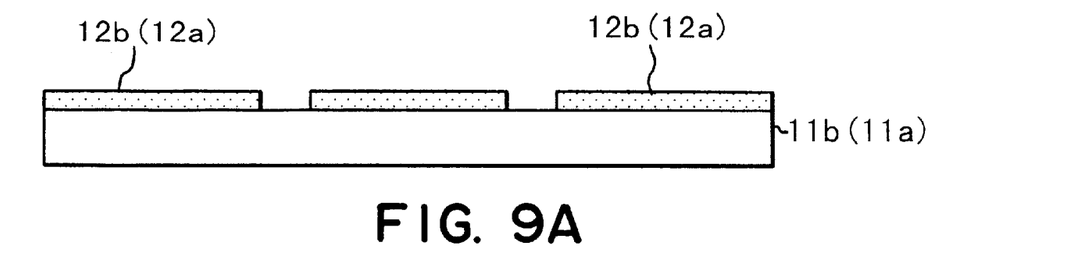
FIGS. 9A–9D are schematic sectional views for illustrating a production process of the liquid crystal device including stripe spacers and a connecting spacer of the present invention.
Figure 9B:
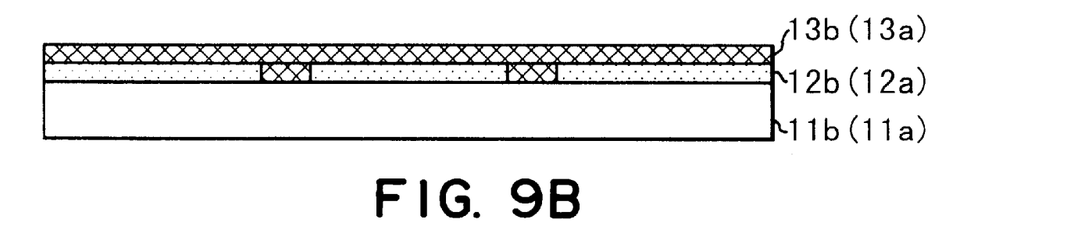
Figure 9C:
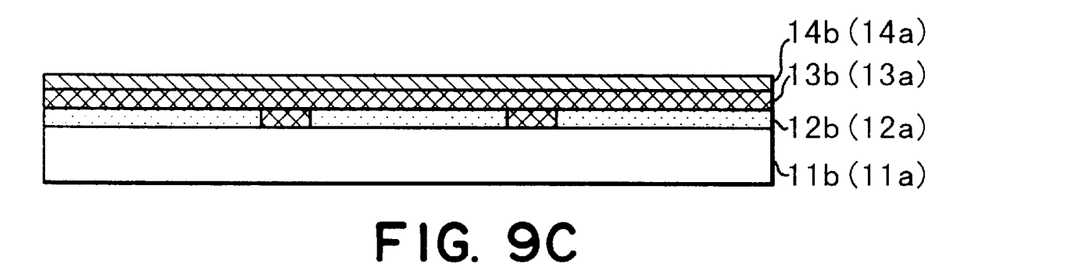
Figure 9D:
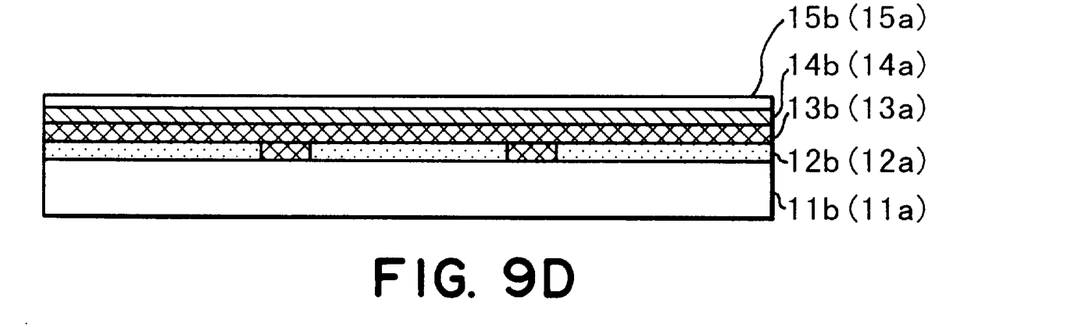

On each of 1.1 mm thick glass substrates 1a and 1b, 700 Å thick stripe-shaped transparent electrodes of 12a (12b) ITO (indium tin oxide) were formed by sputtering and a photolithographic process (FIG. 9A). On the transparent electrodes 12a (12b), a 500 Å thick insulating film 13a (13b) of $SiO_2$ and a 500 Å thick insulating oxide film 14a (14b) of tin oxide containing electroconductive particles were successively formed each by using an angstromer (printing or application means) and curing at 200–300° C. (FIGS. 9B and 9C). Thereafter, ca. 100 Å thick alignment film 15a (15b) of polyimide was formed on the insulating films by applying a polyimide precursor solution by spin-coating and then hot curing (FIG. 9D).

The alignment film showed a surface tension of 35 dyne/cm² as its dispersion item.

On one of the alignment films 15a on the glass substrate 11a, a plurality of spacers 16 of an acrylic-type photosensitive material ("CFPR-016S", mfd. by Tokyo Oka Kogyo K. K.) was formed in a stripe pattern in the following manner.

The acrylic-type photosensitive material was spin-coated on the alignment film 15a and pre-baked at 80–90° C. for 180 seconds. After cooling to room temperature, the photosensitive material was subjected to ultraviolet (UV) light irradiation (energy: 360 mJ/cm², wavelength: 365 nm) using an ultra-high pressure mercury lamp and a photosensitive mask, developed with an alkali developer (a 3% aqueous solution of potassium carbonate) for 70 seconds, subjected to rinse treatment with pure water, and post-baked at 200° C. for 10 minutes in a clean oven to form 1.2–1.3 μm thick stripe-shaped spacers 16 as shown in FIG. 8.

The stripe spacers 16 were disposed in non-pixel (stripe electrode) regions to have a width of 12 μm and a pitch of 180 μm as shown in FIG. 7. The stripe spacers 16 were connected with a connecting spacer 161 (thickness: 1.2–1.3 μm, width: 12 μm) at their ends along one side so as to block each spacing S1 between adjacent stripe spacers 16 (FIG. 8). These stripe and connecting spacers 16 and 161 were formed simultaneously in the same step.

Each of the thus-treated glass substrates 11a and 11b was subjected to rubbing using a cotton rubbing cloth in a longitudinal direction of the stripe spacers 16 from a side of liquid crystal injection port 20 to the opposite side (where the connecting spacer 161 was formed).

On the glass substrate 11a provided with the spacers 16 and 161, a silica solution containing $SiO_2$ particles (particle size of ca. 1.0 μm) was applied by spin-coating. In this regard, the $SiO_2$ particles are embedded into the spacers 16 and 161 in a later step of applying the pair of glass substrates 11a and 11b to each other, thus not adversely affecting a resulting liquid crystal device.

Figure 10:
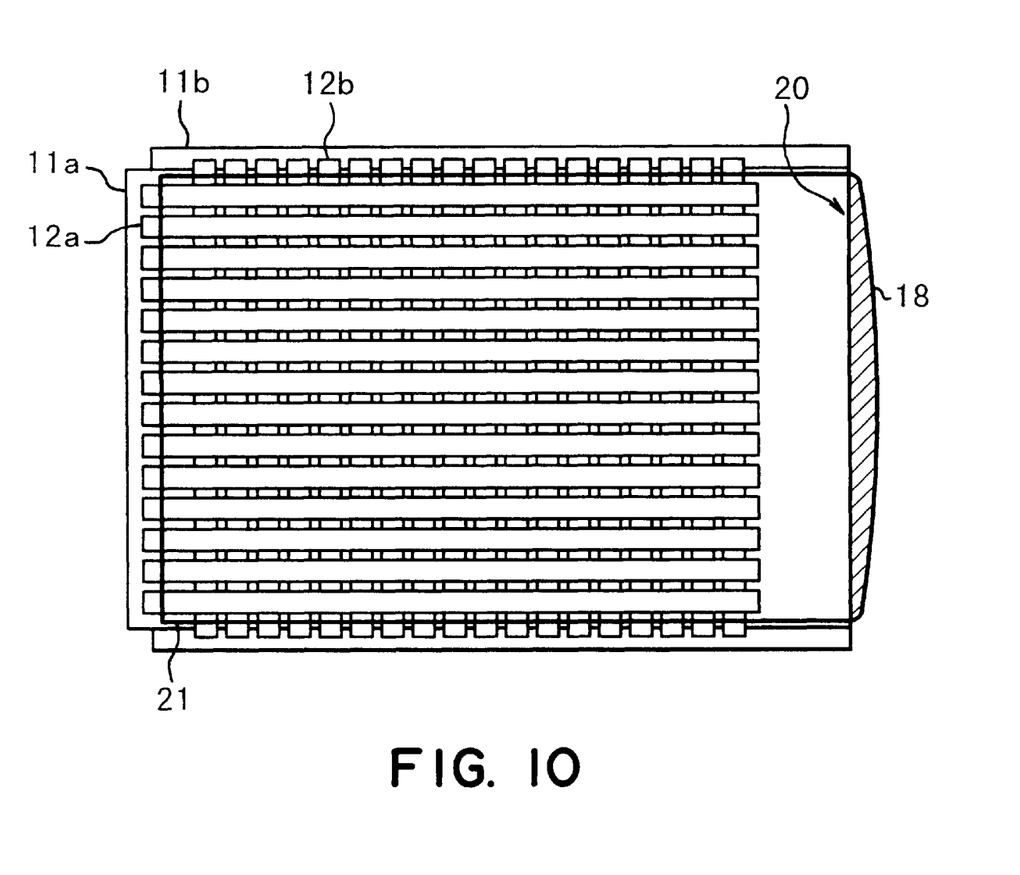
FIG. 10 is a schematic plan view showing an embodiment of the liquid crystal device including stripe spacers and a connecting spacer of the present invention.

At the periphery of the glass substrate 11a, a sealing agent 21 of epoxy resin was applied in a pattern as shown in FIG. 10.

Thereafter, the pair of glass substrates 11a and 11b were applied to each other at 150° C. for 1.5 hours and at a pressure of 1 kg/cm² so that their rubbing directions are identical and parallel to each other and their stripe electrodes (transparent electrodes) 12a and 12b intersect each other at right angles to form a matrix of pixels at their intersections, thus curing the sealing agent 21 (FIG. 10).

The resultant cell structure was subjected to evacuation under reduced pressure (10 Pa) and then restored to atmospheric pressure, thus injecting a liquid crystal 18 at 100° C. (isotropic phase) into the cell structure from an injection port 20, followed by cooling to room temperature to prepare a liquid crystal device (panel).

In this example, three τVmin-mode ferroelectric liquid crystals ("FELIX-017/000", "FELIX-016/030", and "FELIX-016/100, mfd. all by Hoechst Co.), assuming C2 alignment state and negative dielectric anisotropy, were used as the liquid crystal 18.

The respective liquid crystals showed the following phase transition temperatures on temperature decrease and properties.

FELIX-016/000

Phase transition temperature (° C.)

$$\text{Iso} \xrightarrow{93-89} N^* \xrightarrow{85} \text{SmA} \xrightarrow{72} \text{SmC}^* \xrightarrow{-20} X$$

ISO: isotropic phase, N*: chiral nematic (cholesteric) phase, SmA: smectic A phase, SmC*: chiral smectic C phase, and X: higher order smectic phase or crystal phase.

Spontaneous polarization (Ps) at 25° C.: −4.3 nC/cm²

Dielectric anisotropy ($\Delta\epsilon$) at 25° C.: −2.0

FELIX-016/030

Phase transition temperature (° C.)

$$\text{Iso} \xrightarrow{93-90} N^* \xrightarrow{85} \text{SmA} \xrightarrow{72} \text{SmC}^* \xrightarrow{-20} X$$

Ps (at 25° C.): −5.9 nC/cm²

$\Delta\epsilon$(at 25° C.): −2.0

FELIX-016/100

Phase transition temperature (° C.)

$$\text{Iso} \xrightarrow{94-90} N^* \xrightarrow{85} \text{SmA} \xrightarrow{72} \text{SmC}^* \xrightarrow{-20} X$$

Ps (at 25° C.): −10.5 nC/cm²

$\Delta\xi$(at 25° C.): −2.0

In all the thus-prepared liquid crystal devices, the liquid crystal 18 showed a uniform C2 alignment state in the display region and irregular alignment states (blue alignment wherein liquid crystal molecules are twisted between the pair of substrates and/or sanded alignment wherein a chevron (smectic) layer structure is disordered) in a region 19 ranging from the connecting spacer 161 to 3–5 mm therefrom.

The region 19, however, is masked with the masking member 17, thus not adversely affecting display image qualities.

In this example, the stripe spacers 16 (also used as the stripe spacers 53 in the conventional device shown in FIG. 15) were connected with the connecting spacer 161 to block each spacing S1 at their ends on a side of the liquid crystal device, thus improving a liquid crystal injection performance while suppressing disorder of liquid crystal flow in the vicinity of the stripe electrode ends to substantially change the C1 alignment region (as in the conventional liquid crystal device) to the C2 alignment region. As a result, it became possible to attain uniform C2 alignment in the entire display region, thus improving contrast and display qualities.

The spacers 16 and 161 also allow a uniform cell gap over the entire liquid crystal device, thus ensuring a uniform drive characteristic.

Further, the use of the connecting spacer 161 can effectively prevent adverse affects from the outside of the display region (e.g., inferior alignment and cell gap change).

EXAMPLE 5

Figure 11:
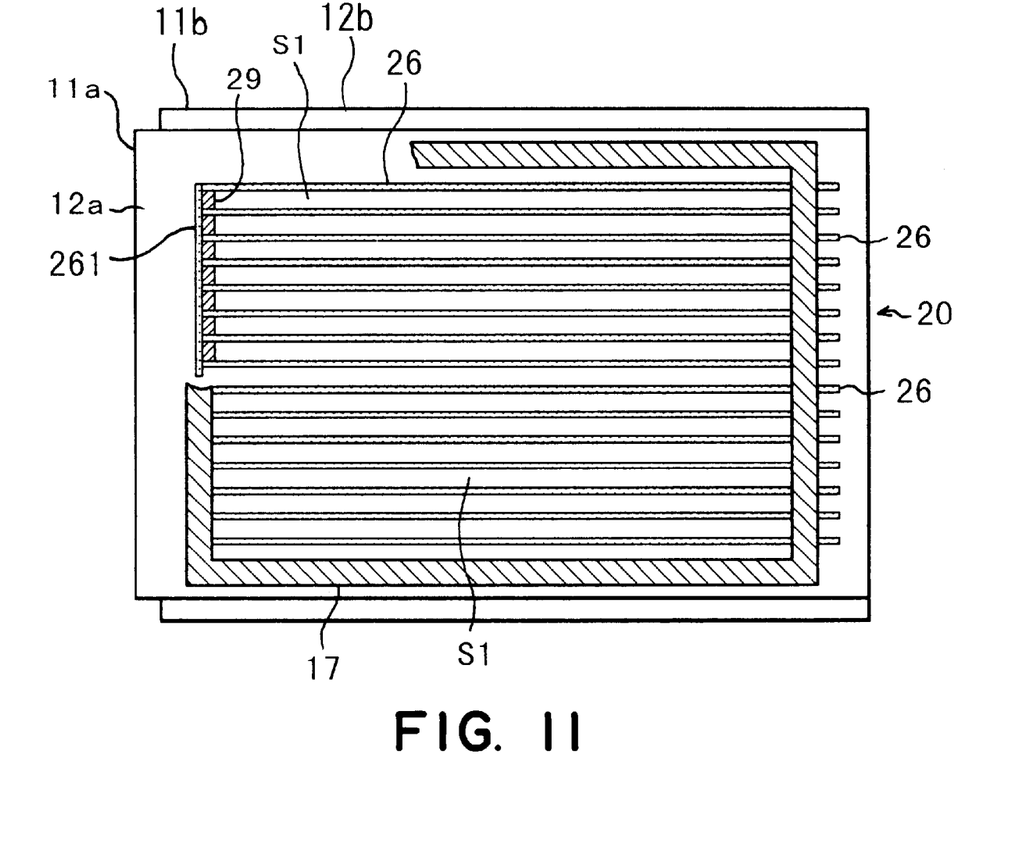
FIG. 11 is a schematic sectional view showing an embodiment of the liquid crystal device including stripe spacers and a connecting spacer of the present invention.
Figure 12:
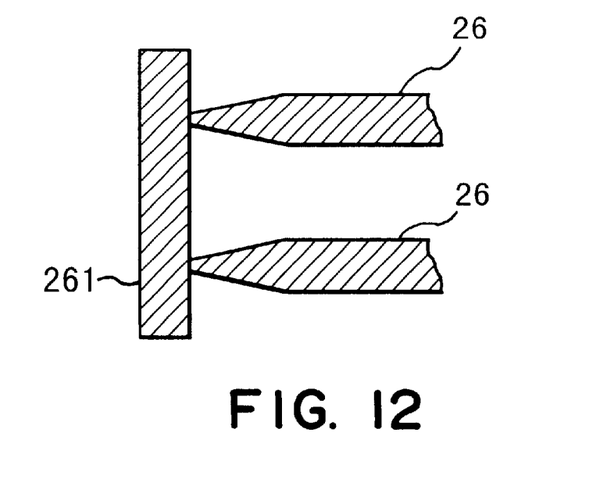
FIG. 12 is a partially enlarged view of adjacent stripe spacers and a connecting spacer shown in FIG. 11.

Three liquid crystal devices as shown in FIG. 11 were each prepared and evaluated in the same manner as in Example 4 except that stripe spacers 26 were connected with a connecting spacer 261 at their tapered portions (length: ca. 5–10 mm) as shown in FIG. 12.

In all the thus-prepared liquid crystal devices, the liquid crystal 18 showed a uniform C2 alignment state in the display region and irregular alignment states (blue alignment and/or sanded alignment) in a region 29 ranging from the connecting spacer 161 to 1–2 mm therefrom.

The region 29, however, was masked with the masking member 17, thus not adversely affecting display image qualities.

According to this example, the use of the stripe spacers 26, each having the tapered portion connected with the connecting spacer 261, effectively improves the liquid crystal flow characteristic in the vicinity of the connecting spacer 261 to reduce the irregular alignment region 29, thus allowing an enlargement of the display region in addition to improvements in contrast and display qualities.

In the above Examples 4 and 5, the connecting spacer 161 or 261 is disposed perpendicular to the stripe spacers 16 or 26 but may be disposed to provide a prescribed angle with the stripe spacers 16 or 26 or formed in an arc shape, as a modification.

Further, the connecting spacer 161 (261) may be formed of epoxy resin in place of the acrylic-type photosensitive material. The stripe spacers 16 (26) may be formed of other photosensitive materials of, e.g., positive-type and negative-type, respectively, instead of the acrylic-type photosensitive material.

In the case where the cell gap between the pair of substrates is uniformly maintained only by the spacers 16 and 161 (26 and 261), $SiO_2$ particles may be reduced in number or omitted. Further, $SiO_2$ particles may be dispersed on the substrate having no spacers thereon.

The rubbing treatment may be performed before the formation of the spacers and may be effected under different conditions between the pair of substrates to an extent not adversely affecting the liquid crystal alignment state. Further, in the rubbing treatment, the cotton cloth used therefor may be changed to other materials such as nylon piles.

The τVmin-mode ferroelectric liquid crystals used in Examples 4 and 5 may be replaced by an anti-ferroelectric liquid crystal or other liquid crystal materials.

As described hereinabove, according to the present invention, the liquid crystal device including wider and narrower gap regions for accomplishing the first object of the present invention employs a plurality of spacers disposed over the wider and narrower gap regions to have a larger volume per unit substrate area in the wider gap region and a smaller volume per unit substrate area in the narrower gap region, thus uniformly forming a prescribed cell gap between a pair of substrates to effectively suppress an irregularity in cell gap in the vicinity of the peripheral frame-shaped region. As a result, in the entire display region, the resultant liquid crystal device is improved in its drive characteristic.

Further, the liquid crystal device including stripe spacers and a connecting spacer for accomplishing the second object of the present invention employs a particular arrangement of the spacers such that the stripe patterns are connected with the connecting spacer at their ends along one side so as to block each spacing between adjacent stripe spacers, thus effectively suppressing disordered flow of an injected liquid crystal conventionally observed at the outer display region close to the peripheral region. As a result, the inferior C1 alignment is not observed in the region, and uniform C2 alignment can be ensured over the entire display region to provide a high contrast and improved image qualities to the resultant liquid crystal device.

What is claimed is:

1. A liquid crystal device comprising:
   a pair of substantially parallel substrates disposed opposite to each other to leave a gap extending two-dimensionally therebetween including a rectangular wider gap region and a peripheral frame-shaped narrower gap region surrounding the wider gap region,
   a masking member disposed on one of the substrates in the narrower gap region, and
   a plurality of stripe-shaped spacers and a liquid crystal disposed together between the pair of substrates in the gap over the wider gap region and the narrower gap region,
   wherein each stripe-shaped spacer extends between the wider gap region and the narrower gap region, and
   wherein the spacers are disposed to have a larger volume per unit substrate area in the wider gap region and a smaller volume per unit substrate area in the narrower gap region.

2. The device according to claim 1, wherein the spacers include a first portion having the larger volume in the wider gap region and a second portion which has the smaller volume in the narrower gap region and is obtained from a portion having a smaller width than that for the first portion before the disposition in the gap.

3. The device according to claim 1, wherein the spacers include a first portion having the larger volume in the wider gap region and a second portion having the smaller volume in the narrower gap region, the first and second portions having an identical width.

4. The device according to claim 1, wherein the spacers include a first portion having the larger volume in the wider gap region and a second portion having the smaller volume in the narrower gap region, the first and second portions having an identical adhesive area per unit substrate area.

5. A liquid crystal device comprising:
a pair of substantially parallel substrates disposed opposite to each other to leave a gap extending two-dimensionally therebetween including a rectangular wider gap region and a peripheral frame-shaped narrower gap region surrounding the wider gap region,
a masking member disposed on one of the substrates in the narrower gap region, and
a plurality of stripe-shaped spacers and a liquid crystal disposed together between the pair of substrates in the gap over the wider gap region and the narrower gap region,
wherein each stripe-shaped spacer extends between the wider gap region and the narrower gap region, and
wherein the spacers are disposed to have a recess for accommodating the masking member in the narrower gap region, while leaving a space between the spacers and the masking member.

6. A liquid crystal device comprising:
a pair of substrates each provided with a plurality of stripe electrodes and an alignment film having a uniaxial alignment axis for aligning a liquid crystal,
a plurality of stripe spacers disposed between the substrates in parallel with stripe electrodes provided to at least one of the substrates, and
a liquid crystal layer comprising a ferroelectric or anti-ferroelectric liquid crystal disposed together with the stripe spacers between the substrates,
wherein the plurality of stripe spacers are connected with a connecting spacer at their ends along one side so as to block each spacing between adjacent stripe spacers and
wherein the connecting spacer is disposed in an arc shape with respective adjacent stripe spacers.

7. A liquid crystal device comprising:
a pair of substrates each provided with a plurality of stripe electrodes and an alignment film having a uniaxial alignment axis for aligning a liquid crystal,
a plurality of stripe spacers disposed between the substrates in parallel with stripe electrodes provided to at least one of the substrates, and
a liquid crystal layer comprising a ferroelectric or anti-ferroelectric liquid crystal disposed together with the stripe spacers between the substrates,
wherein the plurality of stripe spacers are connected with a connecting spacer at their ends along one side so as to block each spacing between adjacent stripe spacers and
wherein each of the stripe spacers has a tapered end connected with the connecting spacer.

8. The device according to claim 7, wherein the tapered end has a length of 5–10 mm.

* * * * *

UNITED STATES PATENT AND TRADEMARK OFFICE
CERTIFICATE OF CORRECTION

PATENT NO.    : 6,603,528 B1                                                    Page 1 of 1
DATED         : August 5, 2003
INVENTOR(S)   : Toshimitsu Tanaka et al.

It is certified that error appears in the above-identified patent and that said Letters Patent is hereby corrected as shown below:

Column 3,
Line 23, "ox" should read -- or --;
Line 49, "($\Delta\xi<0$)" should read -- ($\Delta\varepsilon<0$) --; and
Line 50, "($\Delta\xi>0$)" should read -- ($\Delta\varepsilon>0$) --.

Column 5,
Line 42, "A-A" should read -- 2-2 --.

Column 6,
Line 21, "A-A" should read -- 2-2 --.
Line 49, "(12)" should read -- ($\ell$2) --; and
Line 50, "(13)" should read -- ($\ell$3) --.

Column 9,
Line 40, "13" should read -- $\ell$3 --;
Line 41, "12" should read -- $\ell$2 --;
Line 42, "11" should read -- $\ell$1 --; and
Line 62, "(11=12=13)" should read -- ($\ell1=\ell2=\ell3$) --.

Column 10,
Line 8, "thus prepared" should read -- thus-prepared --;
Line 32, "(13=11)" should read -- ($\ell3=\ell1$) --; and
Line 33, "(12<11, 13)" should read -- ($\ell2<\ell1, \ell3$) --.

Column 12,
Line 65, "$\Delta\xi$" should read -- $\Delta\varepsilon$ --.

Signed and Sealed this

Twenty-seventh Day of January, 2004

JON W. DUDAS
*Acting Director of the United States Patent and Trademark Office*